UNITED STATES PATENT OFFICE.

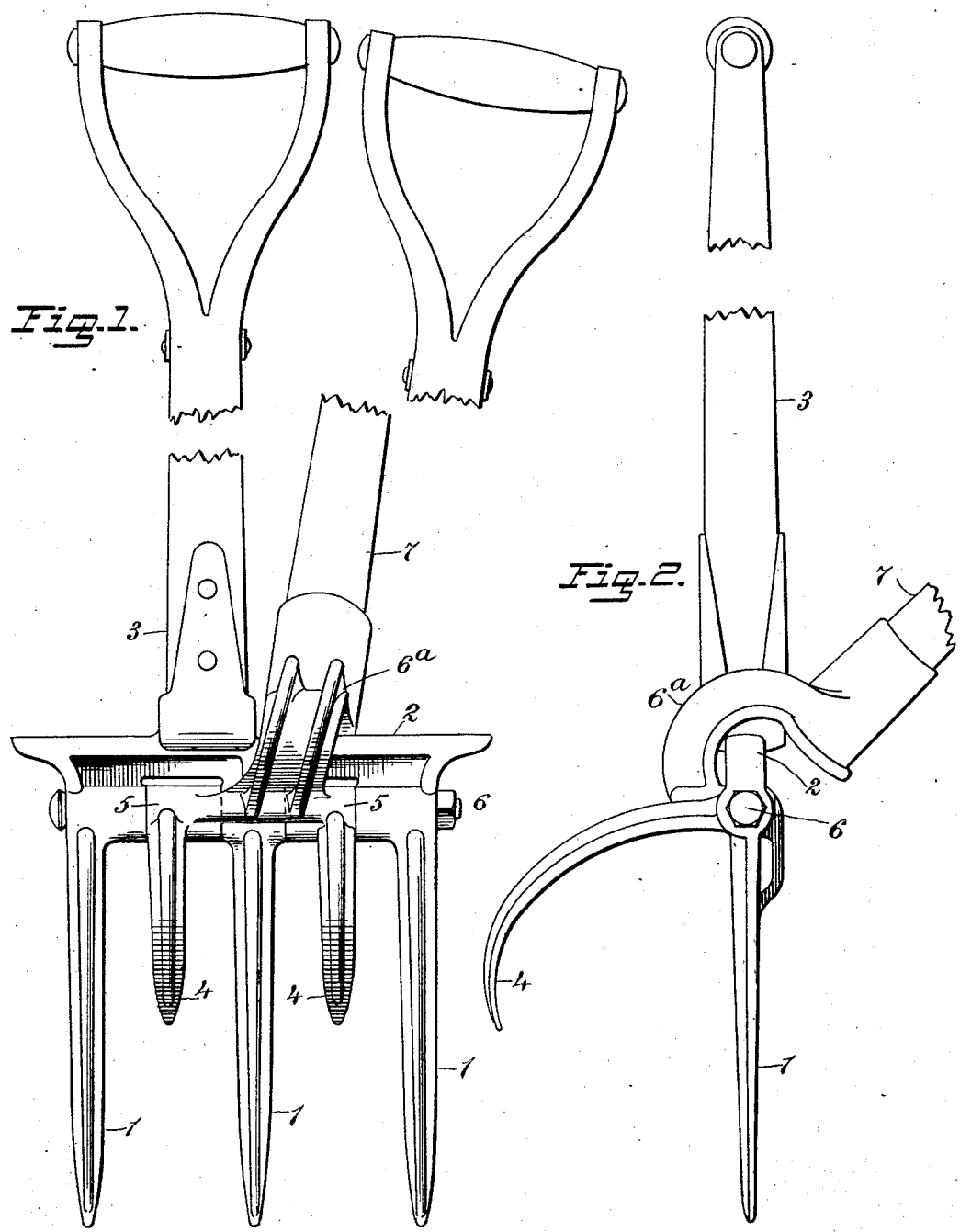

DAVID LUBIN, OF NEW YORK, N. Y.

AGRICULTURAL TOOL.

SPECIFICATION forming part of Letters Patent No. 715,099, dated December 2, 1902.

Application filed January 7, 1902. Serial No. 88,767. (No model.)

*To all whom it may concern:*

Be it known that I, DAVID LUBIN, a citizen of the United States, and a resident of the city of New York, borough of Manhattan, in the county and State of New York, have invented a new and Improved Agricultural Tool, of which the following is a full, clear, and exact description.

This invention relates particularly to improvements in devices for digging and breaking up ground; and the object is to provide a device of this character that may be manually operated to break up and finely pulverize ground with comparatively little exertion on the part of the operator as compared with spading in the ordinary manner.

I will describe an agricultural tool embodying my invention and then point out the novel features in the appended claims.

Reference is to be had to the accompanying drawings, forming a part of this specification, in which similar characters of reference indicate corresponding parts in all the figures.

Figure 1 is a front elevation of a form of agricultural tool embodying my invention. Fig. 2 is a side elevation thereof.

Referring to the drawings, 1 designates tines adapted to be forced into the ground and form a fulcrum for the breaking device. I have shown three tines 1; but it is obvious that my invention is not confined to any particular number. These tines are connected at the top by a cross-head 2, from which a handle 3 rigidly extends. Breaking-tines 4 are mounted to swing relatively to the tines 1. I have here shown two tines 4, adapted to pass between adjacent tines 1. These tines 4 have sleeve portions 5, mounted to rock on a shaft 6, supported in the cross-head, and these sleeves 5 are connected one with the other by an arm 6ª, which is curved upward in such a manner as to pass over the top of the cross-head 2, and this arm 6ª is provided with a handle 7.

In the operation of this device the tines 1 are to be forced into the ground, and this may be conveniently done by a person placing his foot on the cross-head 2. When the tines 1 are thus inserted and the breaking-tines 4 are in the position indicated in Fig. 2, the handle 7 is to be drawn with a quick motion toward the handle 3. This obviously will force the tines 4 into the ground, and the ground dug up by said tines will be forced between the tines 1 and finely broken. The quick motion of the tines 4 passing through the ground will aid materially in the breaking-up process, because of the sharp impact and pushing movement against the earth. After breaking the ground in one spot obviously the tool is to be moved a step farther along the ground.

It is obvious that by an agricultural tool embodying my invention a greater amount of work can be performed with less exertion than is possible with a spade or similar tool that is to be forced into the ground and then manually lifted with the load.

Having thus described my invention, I claim as new and desire to secure by Letters Patent—

1. In an agricultural tool, tines adapted to be forced into the ground, a cross-head on said tines, a handle extended from the cross-head, breaking-tines mounted to swing on said cross-head, and a handle connected to the breaking-tines and normally extended at an angle forward of the first-named handle, substantially as specified.

2. In an agricultural tool, tines adapted to be forced into the ground, a cross-head on said tines, a shaft supported in the cross-head, sleeves mounted to swing on the shaft, tines extended from said sleeves, an arm extended from said sleeves and passing upward and over the cross-head, and a handle attached to the arm, substantially as specified.

In testimony whereof I have signed my name to this specification in the presence of two subscribing witnesses.

DAVID LUBIN.

Witnesses:
 JNO. M. RITTER,
 C. R. FERGUSON.